(12) United States Patent
Kafai et al.

(10) Patent No.: US 11,943,300 B2
(45) Date of Patent: *Mar. 26, 2024

(54) SOFTWARE-DEFINED SENSING

(71) Applicant: HEWLETT PACKARD ENTERPRISE DEVELOPMENT LP, Houston, TX (US)

(72) Inventors: Mehran Kafai, Redwood City, CA (US); Wen Yao, San Diego, CA (US); April Slayden Mitchell, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,150

(22) Filed: Oct. 11, 2021

(65) Prior Publication Data
US 2022/0027204 A1    Jan. 27, 2022

Related U.S. Application Data

(63) Continuation of application No. 15/324,052, filed as application No. PCT/US2014/048292 on Jul. 25, 2014, now Pat. No. 11,159,618.

(51) Int. Cl.
*H04L 67/1008* (2022.01)
*G06F 15/16* (2006.01)
(Continued)

(52) U.S. Cl.
CPC ............ *H04L 67/12* (2013.01); *H04L 12/28* (2013.01); *H04L 67/1008* (2013.01);
(Continued)

(58) Field of Classification Search
CPC ..... H04L 67/12; H04L 67/1008; H04L 12/28; H04L 12/66; H04L 12/44; H04W 4/70
(Continued)

(56) References Cited

U.S. PATENT DOCUMENTS 6,853,958 B1 *  2/2005  Turin ..................... H04L 12/66
                                                          702/182
6,889,169 B2    5/2005  Kirshenbaum et al.
(Continued)

FOREIGN PATENT DOCUMENTS

JP      2011107964 A     6/2011
WO   WO-0126327 A2      4/2001
(Continued)

OTHER PUBLICATIONS

Cosar, S. et al., "A Sparsity-Driven Approach to Multi-camera Tracking in Visual Sensor Networks," 2013 10th IEEE Int'l Conference on Advanced Video & Signal Based Surveillance, pp. 407-413.

(Continued)

*Primary Examiner* — David R Lazaro
*Assistant Examiner* — Berhanu Shitayewoldetadik
(74) *Attorney, Agent, or Firm* — Hewlett Packard Enterprise Patent Department

(57) ABSTRACT

Low-level nodes (LLNs) that are communicatively connected to one another each have sensing capability and processing capability. High-level nodes (HLNs) that are communicatively connected to one another and to the LLNs each have processing capability more powerful than the processing capability of each LLN. The LLNs and the HLNs perform processing based on sensing events captured by the LLNs. The processing is performed by the LLNs and the HLNs to minimize data communication among the LLNs and the HLNs, and to provide for software-defined sensing.

25 Claims, 3 Drawing Sheets

(51) Int. Cl.
*H04L 12/24* (2006.01)
*H04L 12/26* (2006.01)
*H04L 12/28* (2006.01)
*H04L 12/751* (2013.01)
*H04L 15/16* (2006.01)
*H04L 67/12* (2022.01)
*H04W 4/70* (2018.01)
*H04L 12/44* (2006.01)
*H04L 12/66* (2006.01)

(52) U.S. Cl.
CPC .............. *H04W 4/70* (2018.02); *H04L 12/44* (2013.01); *H04L 12/66* (2013.01)

(58) Field of Classification Search
USPC ........................................................ 709/201
See application file for complete search history.

(56) References Cited

U.S. PATENT DOCUMENTS

| | | | |
|---|---|---|---|
| 7,630,736 B2 | 12/2009 | Wang | |
| 7,979,245 B1* | 7/2011 | Bourlatchkov | G06F 11/3409 703/2 |
| 8,037,023 B2* | 10/2011 | Liu | G06F 16/273 707/613 |
| 8,068,986 B1 | 11/2011 | Shahbazi et al. | |
| 8,175,862 B1* | 5/2012 | Bourlatchkov | G06F 11/3409 703/14 |
| 8,855,712 B2* | 10/2014 | Lord | G06F 16/50 348/222.1 |
| 8,892,415 B2* | 11/2014 | Bourlatchkov | G06F 11/3409 703/14 |
| 10,057,123 B1 | 8/2018 | Knight et al. | |
| 11,159,618 B2* | 10/2021 | Kafai | H04W 4/70 |
| 2002/0061025 A1* | 5/2002 | Masunaga | H04L 12/40091 370/402 |
| 2003/0046021 A1* | 3/2003 | Lasky | G05D 1/0261 702/150 |
| 2003/0065409 A1 | 4/2003 | Raeth et al. | |
| 2003/0160695 A1* | 8/2003 | Hisano | G08B 25/009 340/8.1 |
| 2004/0228300 A1* | 11/2004 | Hester | H04W 72/541 370/329 |
| 2005/0028001 A1* | 2/2005 | Huang | H04W 4/50 726/2 |
| 2005/0039107 A1* | 2/2005 | Hander | G06F 40/56 715/256 |
| 2005/0234963 A1* | 10/2005 | Capps | G06F 16/88 707/999.102 |
| 2006/0172784 A1* | 8/2006 | Ara | G01D 21/00 455/574 |
| 2006/0206293 A1* | 9/2006 | Poulin | G06F 40/30 703/2 |
| 2006/0267756 A1* | 11/2006 | Kates | G08B 21/182 340/521 |
| 2007/0030374 A1* | 2/2007 | Ishii | H04N 23/63 348/333.01 |
| 2007/0079223 A1* | 4/2007 | Mondin | H03M 13/3746 714/780 |
| 2007/0086378 A1* | 4/2007 | Matta | H04W 48/12 370/329 |
| 2007/0150565 A1* | 6/2007 | Ayyagari | H04L 67/12 709/223 |
| 2007/0208719 A1* | 9/2007 | Tran | G06F 16/951 |
| 2007/0280255 A1* | 12/2007 | Tsang | H04L 47/801 370/395.2 |
| 2008/0242948 A1* | 10/2008 | Jung | A61B 5/0002 600/300 |
| 2008/0250087 A1 | 10/2008 | Liu et al. | |
| 2009/0063099 A1* | 3/2009 | Counts | G01C 21/20 702/188 |
| 2009/0154534 A1 | 6/2009 | Hassan | |
| 2009/0322518 A1* | 12/2009 | Liang | H04W 24/02 340/539.18 |
| 2010/0097328 A1* | 4/2010 | Simmons | G06F 3/0416 345/173 |
| 2010/0118786 A1* | 5/2010 | Ryu | G01D 21/00 370/328 |
| 2010/0177703 A1 | 7/2010 | Dacosta et al. | |
| 2010/0212013 A1 | 8/2010 | Kim et al. | |
| 2010/0241655 A1* | 9/2010 | Lee | H04W 28/06 707/769 |
| 2010/0260167 A1 | 10/2010 | Kim et al. | |
| 2011/0002251 A1 | 1/2011 | Shin et al. | |
| 2011/0019587 A1 | 1/2011 | Wang | |
| 2011/0044501 A1 | 2/2011 | Tu et al. | |
| 2011/0242113 A1* | 10/2011 | Keall | G06F 15/7807 345/505 |
| 2011/0280154 A1 | 11/2011 | Silverstrim et al. | |
| 2011/0288379 A1* | 11/2011 | Wu | G16H 40/67 600/301 |
| 2011/0317017 A1* | 12/2011 | Shin | H04W 72/12 348/E7.085 |
| 2012/0026938 A1* | 2/2012 | Pandey | H04L 43/065 370/328 |
| 2012/0117268 A1* | 5/2012 | Shaffer | H04W 40/28 709/238 |
| 2012/0207062 A1* | 8/2012 | Corbellini | H04W 74/08 370/256 |
| 2012/0221314 A1* | 8/2012 | Bourlatchkov | G06F 11/3409 703/21 |
| 2013/0122819 A1 | 5/2013 | Vuyyuru et al. | |
| 2013/0157713 A1* | 6/2013 | Stolarczyk | G08B 21/02 455/550.1 |
| 2013/0159350 A1 | 6/2013 | Sankar et al. | |
| 2013/0242929 A1 | 9/2013 | Goergen et al. | |
| 2013/0262012 A1* | 10/2013 | O'Sullivan | H02J 13/00016 702/104 |
| 2013/0265881 A1* | 10/2013 | Filsfils | H04L 45/70 370/241 |
| 2013/0310002 A1 | 11/2013 | Celi, Jr. et al. | |
| 2013/0310062 A1* | 11/2013 | Liu | H04W 16/14 455/454 |
| 2014/0080428 A1 | 3/2014 | Rhoads et al. | |
| 2014/0085480 A1* | 3/2014 | Saptharishi | H04N 21/23113 348/159 |
| 2014/0177634 A1* | 6/2014 | Jiang | H04L 45/74 370/392 |
| 2014/0254433 A1* | 9/2014 | Abe | H04L 45/48 370/256 |
| 2014/0258317 A1* | 9/2014 | Kwan | G06F 16/381 702/56 |
| 2014/0280338 A1* | 9/2014 | Metz | H04L 41/0853 707/774 |
| 2014/0321344 A1* | 10/2014 | Kore | H04W 52/0206 370/311 |
| 2014/0344200 A1* | 11/2014 | Schie | G02B 6/3863 706/20 |
| 2015/0106687 A1 | 4/2015 | McLaughlin et al. | |
| 2015/0120826 A1* | 4/2015 | Gauweiler | H04L 67/104 709/204 |
| 2015/0178176 A1* | 6/2015 | Gilbao | G06F 8/60 714/4.2 |
| 2015/0180963 A1 | 6/2015 | Luecke et al. | |
| 2015/0200723 A1 | 7/2015 | Tochio | |
| 2015/0220983 A1 | 8/2015 | Chauhan | |
| 2015/0254916 A1* | 9/2015 | Hara | G07C 9/00309 340/5.61 |
| 2015/0278486 A1* | 10/2015 | Huang | H04L 63/20 726/1 |
| 2015/0301512 A1 | 10/2015 | Saegusa et al. | |
| 2015/0303950 A1 | 10/2015 | Shattil | |
| 2016/0037014 A1* | 2/2016 | Nozawa | H04N 23/61 386/224 |
| 2016/0050613 A1* | 2/2016 | Zhang | H04L 47/626 370/336 |

(56) References Cited

U.S. PATENT DOCUMENTS

2016/0112824 A1* 4/2016 Tuset Peiró ........ H04W 74/085
370/235
2016/0134512 A1 5/2016 Geng et al.
2017/0371492 A1 12/2017 Chen et al.

FOREIGN PATENT DOCUMENTS

| WO | WO-2008002748 A2 | 1/2008 |
| --- | --- | --- |
| WO | 2013/001276 A1 | 1/2013 |
| WO | 2015/180040 A1 | 12/2015 |

OTHER PUBLICATIONS

Evans, W. C. et al., "Distributed Spatiotemporal Suppression for Environmental Data Collection in Real-World Sensor Networks," 2013, IEEE Int'l Conference on Distributed Computing in Sensor Systems, pp. 70-79, https://infoscience.epfl.ch/record/185241/files/cameraready.pdf.

Nitta, N. et al., "People Counting Across Spatially Disjoint Cameras by Flow Estimation Between Foreground Regions," 2013, 10th IEEE Int'l Conference on Advanced Video & Signal Based Surveillance, pp. 414-419, https://projet.liris.cnrs.fr/imagine/pub/proceedings/AVSS-2013/articles/0703a303.pdf.

Palpanas, T., "Real-Time Data Analytics in Sensor Networks," 2013, pp. 173-210, http://helios.mi.parisdescartes.fr/~themisp/publications/Survey-ensorNetworkAnalytics-2012.pdf.

Wang, X. et al., "Adaptive Data Sensing Rate in Ad-hoc Sensor Networks for Autonomous Transport Application," May 26, 2010, 13th IEEE Int'l Conference on Information Fusion, pp. 1-8, http://www.intelligentcontainer.com/fileadmin/Redakteure/pdfs/2010/SFB637-86-10-007-IC.pdf.

* cited by examiner

SOFTWARE-DEFINED SENSING

CROSS REFERENCE TO RELATED APPLICATIONS

This application is a continuation of, and claims the priority benefit of U.S. patent application Ser. No. 15/324,052, filed on Jan. 5, 2017, issued as U.S. Pat. No. 11,159,618, which is a 371 National Stage Entry of PCT/US2014/048292, filed on Jul. 25, 2014, the contents of which are incorporated herein by reference in their entirety.

BACKGROUND

Sensors have become increasingly employed within a wide variety of different environments. Image- and video-capturing sensors are used to capture images and videos, for surveillance and other applications. Temperature, humidity, and other types of environmental sensors also are commonly deployed. Sensors in general can permit large areas to be remotely monitored to ensure that events of interest are adequately detected.

DETAILED DESCRIPTION

Figure 1:
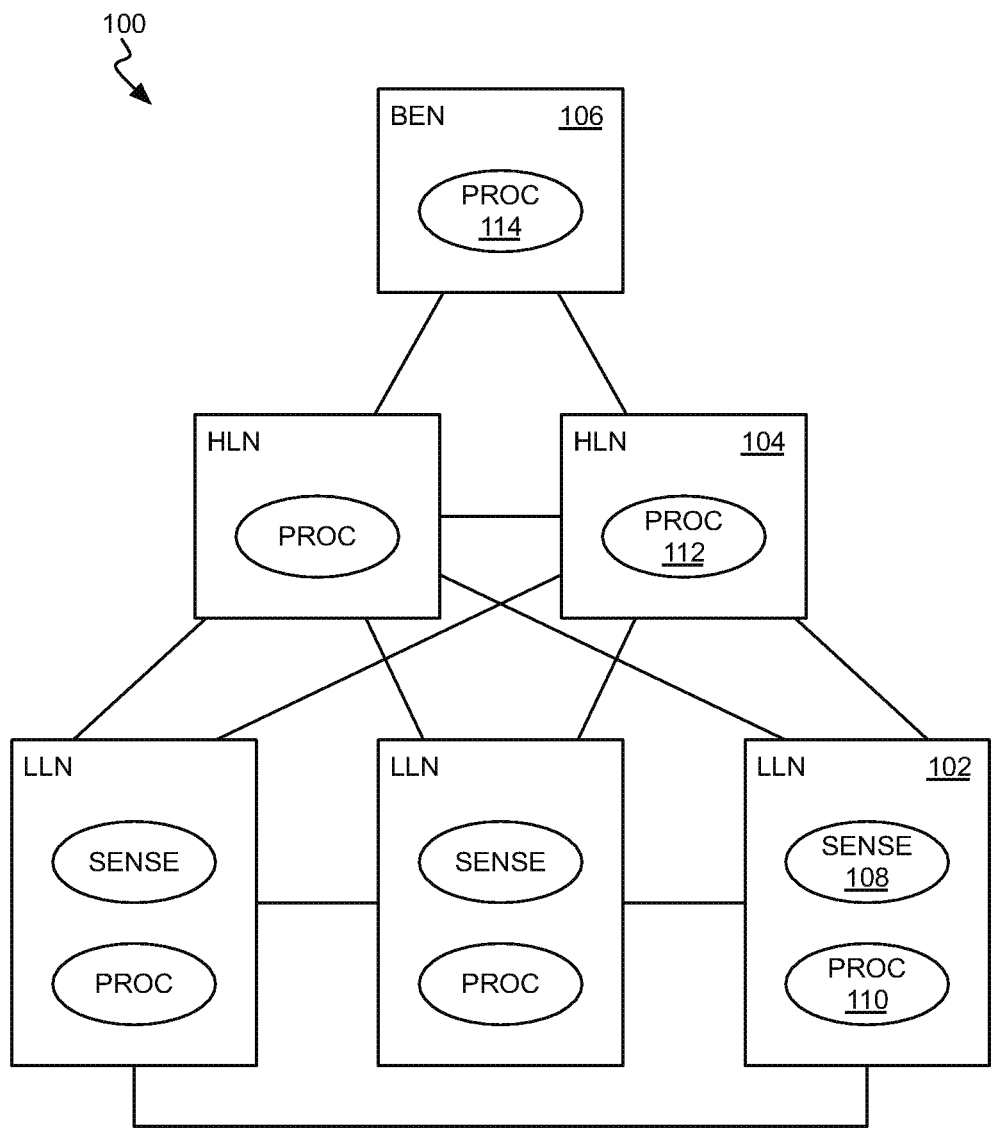
FIG. 1 is a diagram of an example software-defined sensing system.

As noted in the background, a wide variety of different types of sensors can be employed for monitoring environments in conjunction with a number of different applications. Large numbers of homogeneous and heterogeneous sensors may be deployed in sensor networks to canvas a relatively large area. Such sensors may be communicatively connected with one another and with storage and processing devices that store the data collected by the sensors and perform analytical processing on this data.

Existing sensor networks, however, require large amounts of data to be sent from the sensors to more sophisticated devices for processing purposes. This is problematic for a number of reasons. For instance, the networking infrastructure may have to be sufficiently robust to handle the large amounts of data that is being transmitted. Video data in particular is quite voluminous, especially in its raw form.

Furthermore, the constant transmission of such data throughout the network can pose a security risk. A nefarious individual may surreptitiously be able to gain access to the network. Even if such a person is not able to access the individual sensors and processing and storage devices on the network, he or she may be able to insert listening devices on the network that effectively see all the data being transmitted thereon. For large-scale sensor networks that employ public infrastructure like the Internet, this is particularly troublesome, since locking down the networks completely can never be totally guaranteed.

Techniques disclosed herein overcome these and other existing drawbacks to conventional sensor networks. In particular, software-defined sensing networks are provided. Such a network or system includes both light-leaf nodes (LLNs) and heavy-leaf nodes (HLNs). Each LLN has some type of sensing capability as well as processing capability. Each HLN may or may not have sensing capability, and has processing capability greater than that of the LLNs. The LLNs and the HLNs perform processing based on sensing events captured by the LLNs in correspondence with their processing capabilities. The net effect is to minimize raw data transmission among the LLNs and the HLNs within a software-defined sensing topology.

For example, a LLN may perform processing responsive to a sensing event it has captured to generate distilled data from the raw data of the sensing event. The LLN may send the distilled data to an HLN for the HLN to perform decisional or reasoning processing on the distilled data to generate an action from the sensing event. Other or the same LLN(s) may then be directed by the HLN to perform sensing in correspondence with the action. As such, the raw data of the initial sensing event detected may never be sent over the network, maximizing network bandwidth and minimizing security risks.

The software-defined sensing that is provided can be predictive, adaptive, and collaborative. Adaptive sensing attempts to infer what has occurred or what is occurring in conjunction with one or more sensing events to draw a conclusion, on which basis a decision can be made. Predictive sensing can then make an informed guess of what will likely occur in the future based on such decisions or the sensing events themselves. Collaborative sensing can be employed so that the LLNs work together to improve the capture of a sensing event, such as when one of the LLNs first detects the event.

FIG. 1 shows an example system 100. The system includes multiple LLNs 102, multiple HLNs 104, and one or more back-end nodes (BENs) 106. In general, there is a much larger number of LLNs 102 than HLNs 104, and more HLNs 104 than BENs 106. Three LLNs 102, two HLNs 104, and one BEN 106 are depicted in FIG. 1 just for illustrative convenience and clarity.

The nodes 102, 104, and 106 are communicatively connected to one another in a mesh topology. Each LLN 102 is communicatively connected to every other LLN 102 and to each HLN 104, but in at least some implementations is not connected to any BEN 106. Each HLN 104 is connected to every other HLN 104 and to each BEN 106. Where there is more than one BEN 106, each BEN 106 is also connected to every other BEN 106. This mesh topology provides for a certain amount of redundancy and helps in minimizing transmission of data over the network by which nodes 102, 104, and 106 communicate.

Each LLN 102 has sensing capability 108 and processing capability 110. The sensing capability 108 of an LLN 102 permits the LLN 102 to capture sensing events in its proximity. For example, if the sensing capability 108 is image sensing, then the sensing events may be an image resulting from changed motion within the purview of the LLN 102. Each HLN 104 has processing capability 112 as well. The processing capability 112 of each HLN 104 is more powerful than the processing capability of each LLN 102.

Each BEN 106 also has processing capability 114. The BENs 106 act as communication gateways by which the system 100 is interacted with externally. As such, the HLNs 104 are externally accessible through the BENs 106, and the LLNs 102 are externally accessible through the BENs 106 and the HLNs 104—the latter particularly where the LLNs 102 are not communicatively connected directly to the BENs 106. In some implementations, then, the HLNs 104 and the LLNs 102 are not directly accessible externally, which adds security to the system 100 as well.

Figure 2:
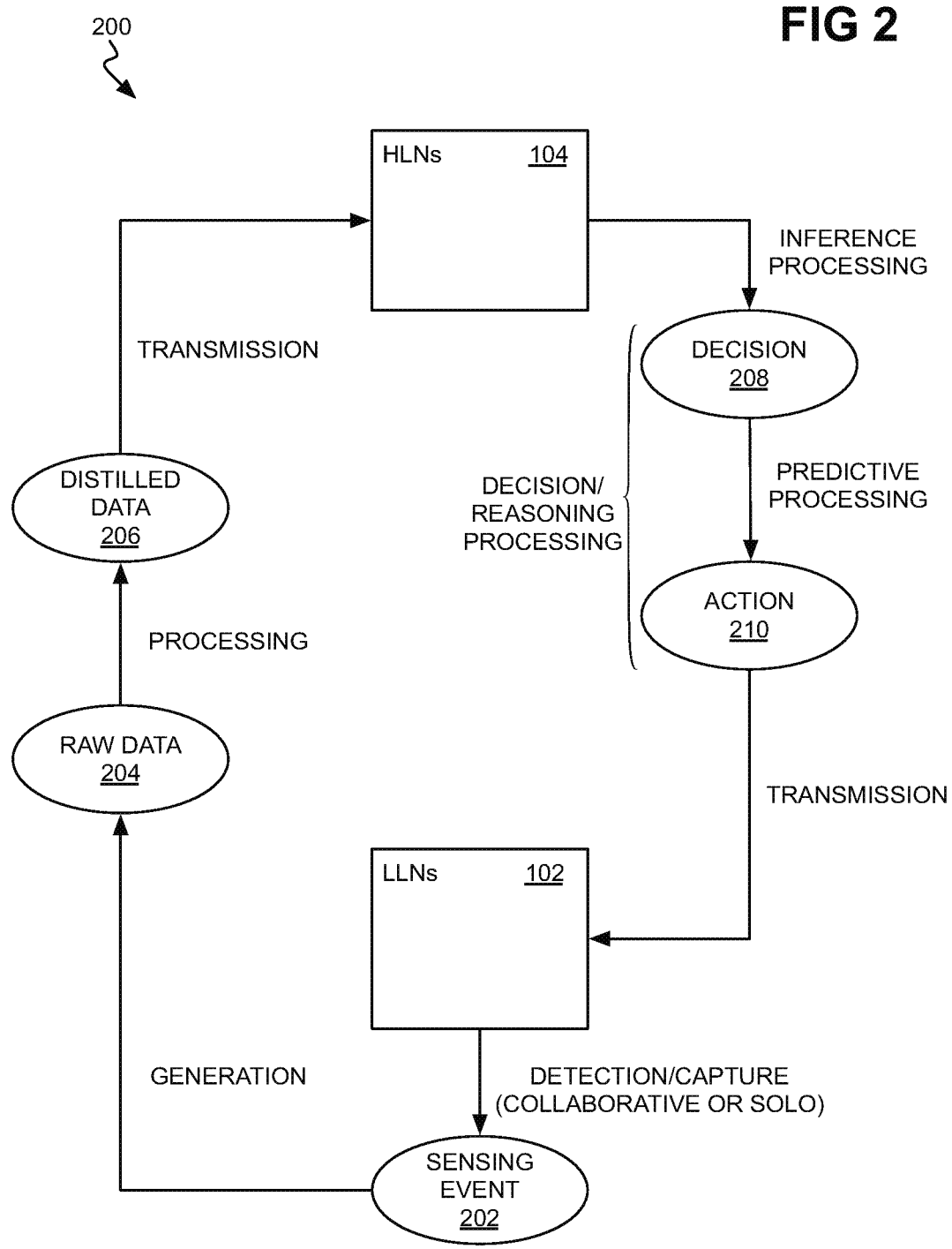
FIG. 2 is a diagram of example operation of the system of FIG. 1.

FIG. 2 shows example operation 200 of the system 100. The LLNs 102 detect or capture a sensing event 202, in a collaborative or individual manner. An example of collaborative sensing, which is a type of software-defined sensing, is a number of LLNs 102 that have image-capturing capability. A given LLN 102 may have its camera aimed at a particular area and detects a potential event of interest. This LLN 102 may inform other LLNs 102 with potentially better views of the area, or with better image-capturing capability, but whose cameras are not currently aimed at the area, to change their fields of view so that they capture this event as well. Or, the LLN 102 may direct other LLNs 102 in adjacent areas to begin image capture at a higher frame rate or better resolution, just in case the subject of the potential event of interest moves into their area.

The capture of the sensing event 202 results in the generation of raw data 204 by the LLNs 102 of the event 202. For example, in the case of a video camera, the raw data 204 may be raw video data of the entire sensing event 202. The LLNs 102 perform low- or mid-level processing on this raw data 204 to generate distilled data 206 therefrom. The distilled data 206 may be a particular frame of the raw data 204, may be a summarization of the raw data 204, such as an anonymization thereof, and/or may in amount be lesser than the raw data 204. The LLNs 102 transmit the distilled data 206, but not the raw data 204 (at least at first) to one or more of the HLNs 104.

The HLNs 104 that receive the distilled data 206 perform mid- or high-level processing on the distilled data 206 of the sensing event 202, in conjunction with that for prior sensing events 202 potentially. In the example operation 200, for instance, such processing can first be inference processing that results in a decision 208 being made. The decision 208 can be likened to a conclusion, indicating a more abstracted form of the sensing event 202. For example, the distilled data 206 may be the detection of a face within an image, whereas the decision 208 may be the identity of the person having this face. Such processing is thus higher level processing on the distilled data 206 than the lower level processing performed on the raw data 204 to generate the distilled data 206. That is, in general, inferential processing is processing performed on the distilled data 206 of the sensing event 202 to draw a conclusion about what has likely occurred in the sensing event 202.

Also shown in the example operation 200 is predictive processing, from at least the decision 208, to generate an action 210. The inference processing through predictive processing process can be considered in sum as decisional or reasoning process to generate the action 210 from the distilled data 206 corresponding to the sensing event 202. The action 210 is an action to be performed by one or more of the LLNs 102, such that it is transmitted to these LLNs 102, which can then prepare themselves to detect the next sensing event that is likely to occur, in correspondence with the action 210.

As an example, the HLNs 104 may make the decision 208 that the face in the image of the distilled data 206 belongs to a person of interest that should be tracked. Therefore, the HLNs 104 determine the likely path that the person of interest is taking, and correspondingly generate an action 210 that is sent to the LLNs 102 located along this probable path. The LLNs 102 may normally be reactive in their sensing event capture, such as via motion detection capability. However, the action 210 may specify that the LLNs 102 are to immediately start recording video at a high-frame rate, so that, for instance, no video of other people that may be accompanying the person of interest and preceding the person along the path is lost.

The example operation 200 of FIG. 2 provides a specific view of the type of software-defined sensing that the system 100 can provide. More generally, the LLNs 102 may themselves perform some types of mid-level processing to make less abstract decisions on which basis to generate actions to command other LLNs 102, for instance. The LLNs 102 may decide to which HLNs 104 to send their distilled data to based on the current utilizations of the HLNs 104, or based on the type of mid- or high-level processing that is likely to be performed by the HLNs 104, where different HLNs 104 may be responsible for different types of such processing.

Further, there can be immediate feedback between the HLNs 104 that receive the distilled data 206 and the LLNs 102 that transmitted the data 206. For example, the HLNs 104 may make an initial decision, and based thereon determine that additional or different distilled data 206—or even some of the raw data 204 itself—is needed for an ultimate decision. As such, the HLNs 104 may request the LLNs 102 in question to provide this additional data.

Ultimately, as has been described above, the software-defined sensing that is provided by the system 100 is adaptive, predictive, and collaborative, in at least one of two ways. First, the software-defined sensing can minimize data communication over the network underlying the communicative interconnection among the LLNs 102 and the HLNs 104. Second, the software-defined sensing can provide for more quickly making decisions, due to the LLNs 102 performing processing in addition to the HLNs 104.

The LLNs 102 may in some highly secure environments never transmit their raw data 204 to any HLN 104. More generally, processing within the system 100 is performed as close as possible to where the raw data 204 of the sensing events 202 are captured. The LLNs 102 perform as much processing as they can in some implementations, before sending their initial results in the form of the distilled data 206 to the HLNs 104 for more complex processing.

The above description of the example operation 200 of the example system 100 can be implemented in a variety of different ways depending on the desired application in question. Two specific non-limiting examples are now presented. The first example is with respect to multiple-tier security access. An LLN 102 may capture an image of a person utilizing an identification card to attempt to secure entry through a door. The LLN 102 is communicatively connected to the card scanner, and sends the card number of the identification card to an HLN 104 that hosts a database of such cards. In turn, the HLN 104 retrieves an image of the face of the person that owns the card number, and returns an identifying facial descriptor of this face back to the LLN 102.

The LLN 102 may then generate a corresponding facial descriptor of the face of the image of the person who used the card to attempt to secure entry, and compare it to the identifying signature provided by the HLN 104. If the descriptors match, the LLN 102 may grant access through the door, either by itself, or by communicating with another LLN 102 to instruct this latter LLN 102 to grant access. If the descriptors do not match, however, then the LLN 102 does not grant access, and instead sends a request to one or more HLNs 104 to retrieve the identification of other, proximate LLNs 102. The LLN 102 then instructs each such proximate LLN 102 to begin capturing video, so that better images of the attempted intruder can be captured.

The second example is with respect to a probabilistic approach to detect, estimate, and infer a person's previous and future location, time threat, intent threat, and so on. People are identified across the network of cameras provided by the LLNs 102, which may be deployed at person-level height. Person detection is performed on each LLN 102. Feature descriptors of the detected people are generated by the LLNs 102, and sent to one or more HLNs 104 that host a database thereof. The LLNs 102 can perform low-level image processing and clustering, and the HLNs 104 can probabilistically perform person identification based on the distilled data they receive from the LLNs 102, to track specific persons as they move throughout the area in which the LLNs 102 are located.

Figure 3:
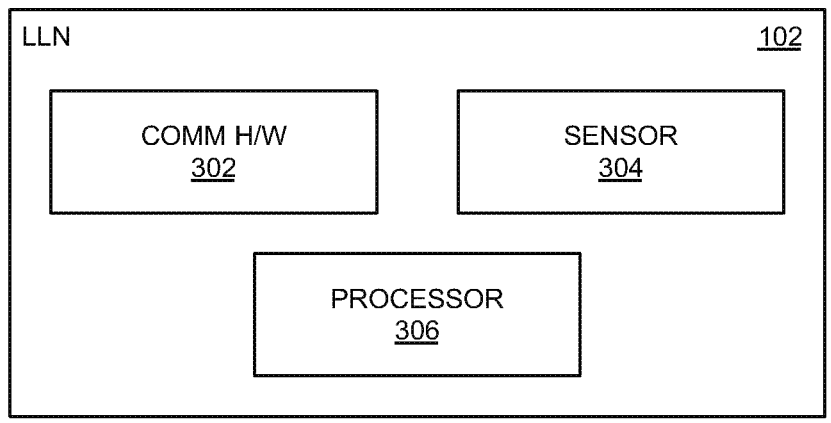
FIG. 3 is a block diagram of an example implementation of a light-leaf node (LLN) of the system of FIG. 1.

FIG. 3 shows an example implementation of an LLN 102 as including communication hardware 302, one or more sensors 304 (although FIG. 3 shows just one sensor 304), and a processor 306. The LLN 102 can include other hardware as well, such as computer-readable media. For such, such media may include volatile and non-volatile storage hardware to store data generated by the sensor 304 and the computer-executable instructions executable by the processor 306 to perform processing.

The communication hardware 302 is hardware that permits the LLN 102 to communicate with other LLNs 102 and with the HLNs 104. The hardware may provide the LLN 102 with wireless or wired networking capability, for instance. The sensor 304 is hardware that provides the sensing capability of the LLN 102. As a non-exhaustive list, the sensor 304 may be one or more of a video-capturing sensor, an image-capturing sensor, and audio-recording sensor, a temperature sensor, and a humidity sensor. As other examples, the sensor 304 may additionally or alternatively be one or more of a Bluetooth sensor, a Wi-Fi sensor, a passive sensor, a radio frequency identification (RFID) sensor, and an infrared sensor. The sensor 304 thus captures sensing events in the proximity of the physical location of the LLN 102, where these sensing events include raw data as has been described.

The processor 306 may be a general-purpose processor, or a special-purpose processing such as an application-specific integrated circuit (ASIC) or field-programmable gate array (FPGA) that is preprogrammed. The processor 306 performs less powerful processing than that performed by the HLNs 104 in that the processor 306 has less processing capacity or capability than that of the HLNs 104. As such, the processor 306 generates distilled data from the raw data of the sensing events, and can send this distilled data to one or more of the HLNs 104 for performing more computationally intensive and abstract processing thereon. For instance, the processing performed by the HLNs 104 may require more processing power than the processing capability of the LLNs 102 can achieve in a desired amount of time. Abstract processing, such as advanced image processing, is an example of such processing.

Responsive to an instruction received by another LLN 102 or by an HLN 104, the processor 306 may predictively and adaptively modify how the sensor 304 is to detect future sensing events. For example, the processor 306 may cause a video sensor to begin capturing video (raw) data prior to an anticipated event occurring. The processor 306 may cause such a video sensor to have its field of view positioned in an area of interest, record at a certain frame rate, and so on. This is one type of predictive sensing, which can thus be defined as causing sensing to be performed in anticipation of a likely event occurring.

Responsive to additional information received from an HLN 104 generated by the HLN 104 from the distilled data that the processor 306 or a different LLN 102 provided, the processor 306 may perform further processing as well. For example, the processor 306 may receive an image feature descriptor from the HLN 104 and compare it to a corresponding descriptor that the processor 306 generated. Based thereon, the processor 306 may then generate an instruction to send to one or more other LLNs 102 to predictively and adaptive modify how the other LLNs 102 are to perform sensing, such as in the multiple-tier security access example described above.

Figure 4:
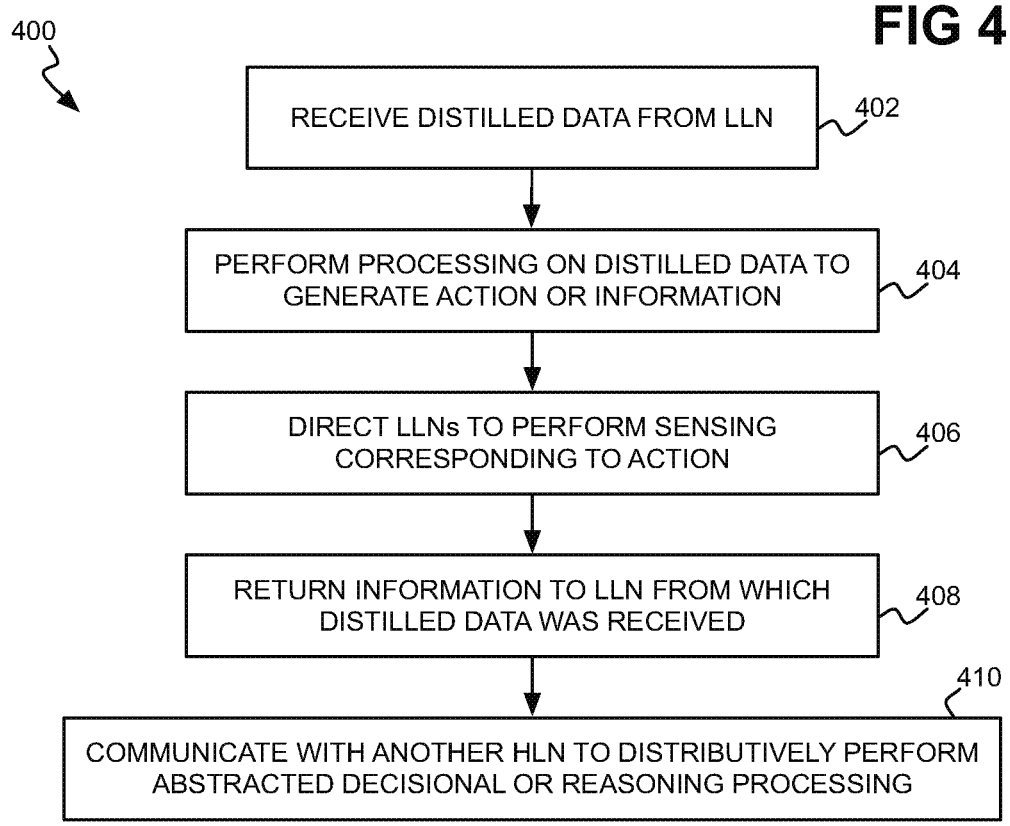
FIG. 4 is a flowchart of an example method performed by a heavy-leaf node (HLN) of the system of FIG. 1.

FIG. 4 shows an example method 400 that is performed by an HLN 104. An HLN 104 can be implemented as an appropriately programmed general-purpose computing device commonly available from a wide variety of different manufacturers, such as a server computing device, a desktop computing device, a laptop computing device, and so on. As such, the HLN 104 typically includes a general-purpose processor that executes computer-executable instructions from a computer-readable data storage medium, like a memory, a hard disk drive, and so on. Execution of these instructions results in performance of the method 400.

The HLN 104 receives distilled data from an LLN 102 that the LLN 102 generated from the raw data of a sensing event (402). The HLN 104 performs processing on this distilled data, to generate an action and/or further information (404). As to the former, the action corresponds to further sensing that one or more LLNs 102 are to perform collaboratively or predictively. As such, predictive and/or inferential sensing is achieved. In this case, then, the HLN 104 directs the LLN(s) 104 in question to perform sensing in correspondence with the action (406).

As to the latter, the further information is yielded by higher level processing performed by the HLN 104 that is then used by the LLN 102 that generated the distilled data that was received. The information is thus returned to this LLN 102 (408). The LLN 102 can then itself perform further lower level processing on the raw data to yield a conclusion regarding the sensing event without having to send any of the raw data to the HLN 104.

Finally, the HLN 104 can act in concert with one or more other HLNs 104, to leverage the computational power available across the HLNs 104. In this respect, the HLN 104 can communicate with one or more other HLNs 104 to perform abstracted decisional or reasoning processing in a distributed manner (410). Computational load balancing may be leveraged across the HLNs 104, for instance, where the HLNs 104 can perform the same type of processing. Additionally or alternative, different HLNs 104 may be specialized for performing different types of processing, such that overall abstracted decisional or reasoning is accomplished by more than one HLN 104 together.

We claim:

1. A system comprising:
    a plurality of light-leaf nodes (LLNs) communicatively connected to one another, each LLN having sensing capability;
    a plurality of heavy-leaf nodes (HLNs) communicatively connected to one another and to the LLNs, each HLN having processing capability; and
    one or more backend nodes (BENs) communicatively connected to the HLNs, each BEN acting as a communication gateway by which the system is interacted with externally, such that the HLNs are externally accessible through the BENs, and the LLNs are externally accessible through the BENs and the HLNs, wherein the LLN of the plurality of LLNs is configured to:
  capture raw data responsive to a sensing event,
  generate distilled raw data from the raw data of the sensing event, and
  transmit the distilled raw data to a given HLN of the plurality of HLNs;
wherein the given HLN of the plurality of HLNs is configured to:
  perform decisional or reasoning processing on the distilled raw data to generate an action,
  transmit instructions for performing the action to the LLN.

2. The system of claim 1, wherein in response to receiving the instructions from the given HLN, the LLN is configured to capture additional raw data in correspondence with the action.

3. The system of claim 1, wherein the LLNs and the HLNs are communicatively connected to one another in a mesh topology in which each LLN is communicatively connected to each other LLN and to each HLN, and in which each HLN is communicatively connected to each other HLN.

4. The system of claim 3, wherein the mesh topology enables the LLNs, HLNs and BENs to provide failure prevention redundancy and minimize transmission of data over the system.

5. The system of claim 3, wherein the mesh topology enables the LLNs, HLNs, and BENs to communicate and provide software-defined sensing within the system.

6. The system of claim 5, wherein the software-defined sensing is predictive sensing in that the sensing of the LLNs is performed according to analysis performed by the HLNs and/or the LLNs as to where a next sensing event is likely to occur.

7. The system of claim 5, wherein the software-defined sensing is adaptive sensing in that the sensing of the LLNs provides for a decision to be made from inferential processing performed by the HLNs from the sensing events.

8. The system of claim 5, wherein the software-defined sensing is collaborative sensing in that the LLNs communicate with one another to improve capture of a sensing event when one of the LLNs first detects the sensing event.

9. The system of claim 1, wherein the action includes recording images at an increased frame rate.

10. The system of claim 1, wherein the action includes identifying motion detection at the location.

11. The system of claim 1, wherein the system prevents raw data from being transmitted between the LLN and the given HLN.

12. The system of claim 1, wherein the location is a door and the action prevents entry through the door.

13. The system of claim 1, wherein the distilled raw data includes a single person tracked through the location.

14. A heavy-leaf node (HLN) for a system including a plurality of light-leaf nodes (LLNs) and one or more other HLNs in communication with each other by a mesh topology to provide software-defined sensing within the system, the HLN comprising:
  communication hardware to communicate with each other HLN and with each LLN;
  a transmitter to receive distilled raw data from one or more of the LLNs;
  a processor to perform processing of the raw data from the hardware sensor and is configured to:
    perform decisional or reasoning processing on the distilled raw data to generate an action; and
    transmit instructions for performing the action to the LLN from which the distilled raw data was received;
  wherein the HLN is communicatively connected to one or more backend nodes (BENs), each BEN acting as a communication gateway by which the system is interacted with externally, such that the HLN is externally accessible through the one or more BENs.

15. The HLN of claim 14, wherein the action includes recording images at an increased frame rate.

16. The HLN of claim 14, wherein the action includes identifying motion detection at the location.

17. The HLN of claim 14, wherein the system prevents raw data from being transmitted between the HLN and the one or more LLNs.

18. The HLN of claim 14, wherein the one or more BENs are not connected to the plurality of light-leaf nodes (LLNs).

19. A method comprising:
  capturing data responsive to a sensing event by a light-leaf node (LLN) of a system of one or more LLNs and one or more heavy-leaf nodes (HLN) communicatively connected to one or more backend nodes (BENs), each BEN acting as a communication gateway by which the stem is interacted with externally;
  transmitting, by the LLN, the data to a given heavy-leaf node (HLN) of a plurality of HLNs; and
  receiving, from the HLN, instructions to generate an action, wherein the HLN processed the data and the instructions are generated from the processed data;
  wherein the LLNs, HLNs, and BENs are connected to one another in a mesh in a topology.

20. The method of claim 19, further comprising capturing, by the LLN, additional raw data in correspondence with the action.

21. The method of claim 19, wherein the LLNs, HLNs, and BENs provide failure prevention redundancy.

22. The method of claim 19, wherein the LLN is externally accessible through the one or more BENs and the HLN.

23. The method of claim 19, wherein the BENs provide software-defined sensing within the system.

24. The method of claim 19, further comprising:
  receiving, by the LLN, information yielded by the processing performed on the distilled raw data; and
  performing by the LLN based on the received information, further processing on the raw data to yield a conclusion regarding the sensing event without having to send any of the raw data to the HLN.

25. The method of claim 19, further comprises communicating with at least one other HLN to distributively perform abstracted decisional or reasoning processing based on sensing events captured by the LLNs.

* * * * *